United States Patent [19] [11] 4,209,566

Betts et al. [45] Jun. 24, 1980

[54] METHOD OF IMPROVING THE ELECTRICAL PROPERTIES OF POLYMERIC INSULATIONS CONTAINING POLAR ADDITIVES, AND THE IMPROVED POLYMERIC INSULATION PRODUCT THEREOF

[75] Inventors: Joseph E. Betts, Westport, Conn.; Fred F. Holub, Schenectady, N.Y.

[73] Assignee: General Electric Company, New York, N.Y.

[21] Appl. No.: 6,713

[22] Filed: Jan. 26, 1979

Related U.S. Application Data

[63] Continuation-in-part of Ser. No. 816,855, Jul. 18, 1977, abandoned.

[51] Int. Cl.[2] ........................ B32B 15/04; H01B 3/00

[52] U.S. Cl. ...................................... 428/389; 156/51; 174/110 PM; 174/110 S; 252/8.1; 260/42.15; 428/379; 428/391

[58] Field of Search ............... 428/391, 379, 384, 389, 428/375; 252/8.1; 156/51; 260/42.15, 45.95 G; 174/110 SR, 110 PM, 110 S; 528/12

[56] References Cited

U.S. PATENT DOCUMENTS

| | | | |
|---|---|---|---|
| 2,364,410 | 12/1944 | Whittaker | 260/45.85 R |
| 2,484,595 | 10/1949 | Sprung | 260/375 B |
| 3,148,169 | 9/1964 | Martens et al. | 428/447 X |
| 3,700,625 | 10/1972 | Brady et al. | 252/8.1 X |
| 3,742,084 | 6/1973 | Olyphant, Jr. et al. | 428/447 X |
| 3,860,676 | 1/1975 | Krackeler et al. | 260/897 B X |
| 3,900,681 | 8/1975 | Walters | 428/379 |
| 3,923,731 | 12/1975 | MacKenzie, Jr. | 428/379 X |
| 3,936,572 | 2/1976 | MacKenzie, Jr. et al. | 428/379 |
| 3,957,719 | 5/1976 | MacKenzie, Jr. | 260/42.42 |
| 4,022,945 | 5/1977 | MacKenzie, Jr. et al. | 428/389 |

*Primary Examiner*—Lorraine T. Kendell

*Attorney, Agent, or Firm*—Paul E. Rochford; Walter C. Bernkopf; Philip L. Schlamp

[57] ABSTRACT

The electrical properties of polymeric dielectric materials or compounds including polar additives are enhanced by a method of treating the polar additives with a reactive silicone liquid, and the improved polymeric insulation products of the method.

18 Claims, 1 Drawing Figure

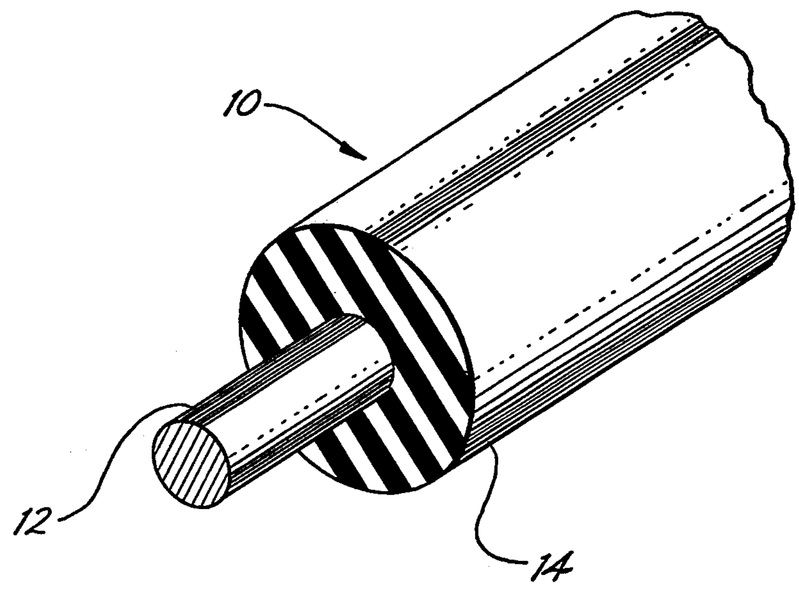
10
12
14

METHOD OF IMPROVING THE ELECTRICAL PROPERTIES OF POLYMERIC INSULATIONS CONTAINING POLAR ADDITIVES, AND THE IMPROVED POLYMERIC INSULATION PRODUCT THEREOF

This application for patent is a continuation-in-part of our previous application, Ser. No. 816,855, filed July 18, 1977, of the same title, and now abandoned.

BACKGROUND OF THE INVENTION

Highly polarized compositions or materials have long been known to have decidedly and severely detrimental effects upon the electrical properties, such as insulation resistance and dielectric strength, of typical dielectric electrical insulating compositions or compounds thereof. This markedly detrimental effect upon electrical properties presents a significant obstacle or absolute deterrent to the addition or use of a number of common additives or agents which have highly polar characteristics, such as flame retardants comprising halogens or phosphates, in many types of dielectric electrical insulating materials.

Accordingly, the utilization of many highly effective, commercial flame retarding agents is therefore either precluded from service in dielectric electrical insulating materials or products thereof, or the tolerable amounts or proportions of such highly polar flame retardant additives are so reduced or restricted in compromising or offsetting one desired property against another, so as to significantly diminish the potential effectiveness of such flame retarding agents and thereby significantly lower the level of resistance to flame and combustion otherwise obtainable in electrical materials or products utilizing such materials.

SUMMARY OF THE INVENTION

This invention comprises the treatment of polar additives, such as halogen containing materials, for use in polymeric electrical insulating compounds, with a heat reactive, liquid silicone polymer to enhance the electrical properties of polymeric compounds containing such polar additives, and products of enhanced electrical properties comprising polymeric electrical insulations including polar additives treated with heat reactive, liquid silicone polymers. This invention accordingly relates to polymeric electrical insulating compounds containing polar fillers or additives which have good electrical properties, and in particular the invention comprises polymeric electrical insulations or compounds therefor and insulated conductors which include halogen-containing flame retarding agents and thereby possesses good electrical properties as well as a high degree of resistance to flame and combustion.

OBJECTS OF THE INVENTION

It is a primary object of this invention to provide a method of improving the electrical properties of polymeric electrical insulation compounds containing highly polar additives.

It is also an object of this invention to provide polymeric insulating compounds containing polar additives for electrical conductors, having advantageous and outstanding electrical properties which are enduring and longlasting even under adverse or severe conditions or environments.

It is a further object of this invention to provide an improved method of producing flame resisting polymeric electrical materials or compounds containing highly polar halogen flame retardant compositions or agents, and products thereof such as insulated electrical conductors, having advantageous and outstanding electrical properties such as insulation resistance and dielectric strength.

It is an additional object of this invention to provide a flame resisting polymeric electrical insulating material or compound containing a highly polar halogen flame retarding composition or agent and having improved and enduring electrical properties such as insulation resistance and dielectric strength, and products thereof such as insulated electrical conductors.

BRIEF DESCRIPTION OF THE DRAWING

The FIGURE comprises a perspective view of an insulated conductor comprising a metallic element having a polymeric insulating compound containing a halogen flame retardant of this invention thereabout.

DESCRIPTION OF A PREFERRED EMBODIMENT

Electrical insulations comprising polymeric materials or compounds and including highly polar ingredients, such as halogen-containing flame retardant compositions or agents, and having significantly improved and lasting electrical properties, are produced according to the method of this invention by pretreating the highly polar ingredients with a heat reactive, liquid silicone polymer composition, and heating the polar ingredients with the liquid silicone polymer prior to combining the polar ingredients with the polymer material or ingredients of a polymeric compound thereof.

Although this invention applies to polymeric insulating materials, or compounds thereof, generally, including the known and currently used polymeric compositions such as rubbers or elastomers, and newly developed polymeric compositions suitable for use in electrical insulating service, the invention is particularly concerned with polymeric insulations comprising polyolefin polymers because of their unique attributes for electrical insulations and extensive use in this service.

The polyolefin polymeric materials which can be employed in the practice of this invention comprise ethylene-containing polymers such as polyethylene, copolymers of ethylene and other polymerizable materials, and blends of such polymers including copolymers. Typical copolymers of ethylene include, for example, ethylene-propylene copolymers and ethylene-ethyl acrylate and ethylene-methyl acrylate.

The flame-resistant, polyolefin polymers, or compounds thereof, of this invention can additionally comprise fillers, for example, extending or reinforcing components such as silica, clay or fiber, pigments, curing coagents, and other conventional additives including preservatives, such as antioxidants, modifying agents such as plasticizers, processing aids, mold release ingredients or lubricants, and the like which are commonly compounded with polyolefin polymers or typical products formed therefrom such as, for example, electrical insulations.

This invention also specifically applies to and includes all of the above-referenced polyolefins in a crosslink cured and thermoset state, when effected by means of high energy irradiation such as by electrons or a heat-activatable organic peroxide crosslinking agent such as disclosed in U.S. Pat. Nos. 2,888,424; 3,079,370; 3,086,966; and 3,214,422. Suitable peroxide crosslink curing agents comprise organic tertiary peroxides characterized by at least one unit of the structure:

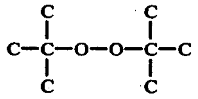

which decomposes at a temperature above about 146° C. (295° F.) and thereby provides free radicals. Preferred peroxides for curing polyolefins are a di-α-cumyl peroxide, and other apt peroxides comprising the tertiary diperoxides such as 2,5-dimethyl-2,4-di(t-butyl peroxy) hexane, and 2.5-dimethyl-2,4-di(t-butyl peroxy)hexyne-3, and the like diperoxy and polyperoxide compounds.

The highly polar flame retardants used in the practice of this invention can comprise any of the halogen containing compositions or agents which have heretofore been used, including the halogenated hydrocarbons of U.S. Pat. Nos. 2,480,298; 3,340,226; 3,582,518; 2,705,128; 3,740,245; and 3,741,893.

For example, conventional halogenated hydrocarbons for flame resistance comprise chlorinated parrafin, chlorinated propanes, chlorinated propylenes, hexachloroethane, chlorinated polythene, chlorinated polyisobutylene, polyvinyl chloride, polyvinylidene chloride, after-chlorinated polyvinyl chloride, chlorinated polyphenyls, chlorinated naphthalenes, hexachlorobenzene, chlorinated indenes, chlorinated polystyrenes, chlorinated diphenyl alkanes, and their brominated or other halogenated equivanents such as hexabromobiphenyl, decabromobiphenyl or decabromobiphenyl oxide. Also included as conventional halogenated hydrocarbons are proprietary halogenated flame retardants such as Hooker Chemical Company's Dechlorane Plus 515, Diamond Alkali Company's Chlorowax, and similar products.

As is conventional in the use of halogen-based flame retarding agents or compositions, an antimony oxide or equivalently functioning metal oxide, can be included along with the halogen-containing flame retardant to provide the well known flame resisting system. The halogen flame retardant and/or antimony oxide, or its equivalent, may be utilized in conventional amounts or proportions to achieve the degree of resistance to flame or combustion needed or desired.

The heat reactive liquid silicones for the treatment of this invention comprise relatively low molecular weight silicone polymers of polyfunctional silicone monomers which are amenable to further polymerization such as when thereafter subjected to increased temperatures. Heat reactive, liquid silicone polymers of polyfunctional silicone monomers for use in the practice of this invention comprise mixtures of different multifunction alkyl and/or aryl siloxane monomers, and can include some monofunctional siloxane monomers, represented by the following formula:

$$R_nSiX_{4-n}$$

wherein an R can be an alkyl radical, such as methyl, ethyl, propyl, etc., or an aryl radical, such as phenyl, etc., or mixture of such alkyl and aryl radicals; and X can be $O_{0.5}$, OH, $OC_2H_5$, $OCOCH_3$, etc.; and n ranges from 0 to 3.

For example, a heat reactive, liquid silicone polymer product of a preferred embodiment of this invention comprises the low molecular weight polymers formed of a mixture of about 5 to about 25 mole percent of trifunctional $CH_3SiO_{1.5}$ monomeric units and about 95 to about 75 mole percent of difunctional $(CH_3)_2SiO$ monomeric units. The polymerizable polyfunctional silicone monomeric units, or mixtures of such monomeric units, can contain minor amounts of tetrafunctional $SiO_2$ momeric units and/or monofunctional $(CH_3)_3SiO_{0.5}$ monomeric units, each in proportions of about 0.1 up to about 10 mole percent of the monomeric units, as a means of providing a control upon the formation and subsequent progression of polymeric three-dimensional molecular structures, or crosslinking. Such heat reactive liquid silicone polymers can have their molecular growth regulated with end-stopping units of any of a variety of reactive terminal group such as hydroxy, alkoxy, acetoxy, and the like.

The aforesaid low molecular weight liquid silicone polymers of polyfunctional silicone monomers will further react and polymerize or cure by the formation or extension of three-dimensional molecular structures, or crosslinking, when subjected to moderate increases in temperature levels such as about 150° C. and preferably higher, or about 175° C. for a period of up to several hours. The period of the heating should be sufficient to increase the temperature of the overall mass of material undergoing treatment to the prescribed temperature level for a time adequate to induce a reaction of the liquid silicone polymer and the formation of a reaction product thereof of higher molecular weight silicone polymers.

Suitable amounts of the heat reactive liquid silicone polymer comprise at least about 1 percent by weight of the material to be combined therewith for the treatment, and preferably about 2 percent up to about 5 percent by weight thereof.

Additional optional ingredients which can be included in the practice of the invention comprise lead compounds such as dibasic lead phthalate, silicone gums or elastomers, and fumed silica.

A suitable silicone gum comprises gums of organopolysiloxanes which have been condensed to a relatively high molecular weight polymer of a gummy elastic, substantially solid state. For example a typical silicone elastomer for use in the composition of this invention is a class of dimethylpolysiloxanes having the chemical structure:

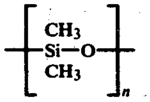

Other classes of silicone gums or elastomers for use in this invention are the methyl-phenyl polysiloxanes, and such silicones containing small amounts of vinyl groups. Further examples of the type of silicone elastomer gums usable in obtaining the compositions of this invention comprise the organopolysiloxanes referred to in U.S. Pat. Nos. 2,888,424 and 2,888,419, and identified in detail in U.S. Pat. Nos. 2,448,556; 2,448,756; 2,457,688; 2,484,595; 2,490,357; 2,521,428; 2,541,137; 3,098,836; and 3,341,489. Such high molecular weight polymers normally have Brookfield viscosities of in excess of about 100,000 centipoise at 25° C.

The fumed silica comprises a form of silica described in U.S. Pat. No. 2,888,424, and a type which is sold under the trade designation of Cabosil MS7 of Godfrey L. Cabot, Inc., of Boston, Mass.

The following examples of the method and product of this invention and comparative evaluations and date derived therefrom demonstrate the improved and lasting electrical properties, as well as other beneficial and improved characteristics, attributable to the novel method of this invention, with respect to a substantially identical composition for a standard of comparison. The insulating composition formulations of the examples of this invention and also of the standard are all given in parts by weight, and the compositions of the examples of this invention and of the respective standard were each crosslink cured and tested or evaluated under identical conditions.

The relative degrees of resistance to flame and combustion of the various compositions of the examples of this invention and of the standards were all determined in accordance with the Oxygen Index Test procedure prescribed in ASTM Test Method D-2863-70, and as described in U.S. Pat. Nos. 3,755,214 and 2,787,356. As is known, this test designates the fractional proportion of oxygen by volume in nitrogen required to just maintain flaming of the material of the test sample. Thus, the higher the oxygen index for a composition, the better its resistance to flame and combustion.

In accordance with this invention, a flame retarding system of a combination of ingredients including a brominated composition, as set forth below, was pretreated as follows:

The combination of ingredients providing the flame retarding system including the highly polar halogen composition, and the liquid silicone polymer for the pretreatment of the components of the ingredients of the system, and their relative proportions in weight, were:

| | Parts | Percent |
|---|---|---|
| Decabromodiphenyl ether | 100 | 66.12 |
| Antimony oxide | 35 | 23.14 |
| Fumed silica | 12.5 | 8.26 |
| Liquid silicone polymer | 3.75 | 2.48 |
| | 151.25 | 100.00 |

The liquid silicone polymer comprised the product of about 7 mole percent of trifunctional $CH_3SiO_{1.5}$ monomeric units and about 93 mole percent of difunctional $(CH_3)_2SiO$ monomeric units, and had a molecular weight in the approximate range of about 2000 to about 10,000 with a viscosity of about 10 to about 50 centistokes at 25° C.

The above ingredients consisting of the flame retardant system containing a highly polar agent, were pretreated with the heat reactive liquid silicone polymer by adding and effectively dispersing the liquid silicone through a mixture of the above given ingredients of the system in a suitable mixing apparatus, then heating the resultant mix of dispersed liquid silicone and ingredients to effect a reaction of the silicone. In this instance the resultant mix was ovenized at about 190° C. (375° F.) for approximately 16 hours.

The resultant silicone treated ingredients of the flame retarding system of decabromodiphenyl ether, antimony oxide and fumed silica, in the given amounts, were incorporated into the following crosslink curable polyethylene electrical insulating compound, wherein all ingredients are given by weight. For comparison, a substantially identical formulation wherein the ingredients of the flame retarding system were not treated with the liquid silicone polymer is provided, with all ingredients given by weight. Other than the treatment step and the approximately 1.5 parts by weight of silicone polymer used therefor, all operations or steps in the preparations of the insulating compounds of the example of this invention and the standard were identical.

| | STANDARD | | EX. OF INVENTION | |
|---|---|---|---|---|
| INGREDIENTS | Parts | Percent | Parts | Percent |
| Polyethylene | 100 | 56.98 | 100 | 56.50 |
| Decabromodiphenyl ether | 40 | 22.79 | 40 | 22.61 |
| Antimony oxide | 14 | 7.98 | 14 | 7.91 |
| Fumed silica | 5 | 2.85 | 5 | 2.82 |
| Liquid silicone polymer | — | — | 1.5 | 0.85 |
| Silicone gum | 5 | 2.85 | 5 | 2.82 |
| Octamethylcyclotetrasiloxane | 1.25 | 0.71 | 1.25 | 0.71 |
| Polymerized trimethyl dihydroquinoline (Agerite MA) | 1.5 | 0.85 | 1.5 | 0.85 |
| 4,4'-thiobis-(6 tert-butyl-m-cresol) (Santowhite Crystols) | 0.25 | 0.14 | 0.25 | 0.14 |
| Triallyl cyanurate curing agent | 1.0 | 0.57 | 1.0 | 0.56 |
| Dicumyl peroxide curing agent | 2.5 | 1.42 | 2.5 | 1.41 |

Polyethylene electrical insulating compositions of each of the foregoing formulations, comprising the compound with the untreated flame retardant ingredients or system as the standard and the compound with the treated flame retardant ingredients or system of the invention, were extruded on wire in the same thickness and under identical conditions in all respects, including crosslink curing of the insulation.

Like samples of wire insulated with both of said compositions were subjected to identical test conditions and test procedures, and evaluations as follows:

All test samples were exposed to a so-called "LOCA" or "Loss-of-Coolant Accident" test, (IEEE standard 323-1974) to simulate aggressive conditions encountered in a nuclear reactor facility. This test comprised placing the insulated wire samples in a pressurized chamber for 110 days under high temperature and pressures and applying a water spray to the samples.

The electrical and other properties of the electrical insulations of the wire samples for both the standard and this invention were as follows:

| PROPERTIES | STANDARD | EXAMPLE |
|---|---|---|
| Before "LOCA" | | |
| Dielectric strength (original) | 1220 V/MIL | 1170 V/MIL |
| Theoretical Percent of Flame Retardant in Original Compound | 22.79% | 22.61% |
| After "LOCA" | | |
| % Flame Retardant Retained | 10.60% | 22.2% |
| Oxygen Index | 23.2% | 29.0% |
| FR-I Flame Test | Failed | Passed |
| Insulation Resistance Meg Ohm - 1000 ft. | 4000 | 36,000 |
| Dielectric Strength | 275 V/MIL | 1083 V/MIL |
| EM60 | | |
| One Day | | |
| % P.F. at 80 V/M | 5.81 | 2.36 |
| SIC | 3.07 | 262 |

-continued

| PROPERTIES | STANDARD | EXAMPLE |
|---|---|---|
| Stability Factor | 0.52 | 0.22 |
| Seven Days | | |
| % P.F. at 80 V/M | 5.50 | 2.34 |
| SIC | 3.46 | 2.68 |
| Fourteen Days | | |
| % P.F. at 80 V/M | Burned | 2.44 |
| SIC | out at | 2.68 |
| Stability Factor | 2.4 Ku | 0.24 |
| Percent SIC Increased | | |
| 1-14 Days | no reading can | 2.29 |
| 7-14 Days | be obtained | 0.00 |

The foregoing test results and data established the improved and lasting electrical properties attributable to this invention.

As noted above, the crosslink cured, flame resistant polyolefins, or compounds thereof, of this invention are particularly useful materials for dielectric insulations for electrical conductors such as wire and cable.

Referring to the drawing, there is shown a typical construction for an insulated electrical wire or cable product 10, comprising a metallic conductive element 12 and an overlying body of cured polymeric insulation 14 extending thereabout or covering the conductor. In the drawing, the product 10 is illustrated as a short section with the insulation 14 removed from the end portion of the conductor 12. According to one embodiment of this invention, the novel flame-resistant polyolefin thereof can be used to provide or form the insulation 14 on conductive element 12 of wire or cable product 10. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A method of enhancing the electrical properties of a polymeric electrical insulation compound containing a polar halogen compound additive, comprising treating the polar halogen compound additive by dispersing a heat reactive, liquid silicone polymer through the polar halogen compound additive and heating the polar halogen compound additive with the heat reactive liquid silicone polymer dispersed therethrough to a temperature and for a time sufficient to effect a reaction of the silicone, then combining said heat reacted, liquid silicone polymer treated polar halogen compound additive with the polymeric compound.

2. The method of claim 1, wherein the heat reactive, liquid silicone polymer comprises the product of polyfunctional silicone monomers.

3. A method of enhancing the electrical properties of a polymeric electrical insulation compound containing a halogen compound additive, comprising treating the halogen compound additive by dispersing a reactive, liquid silicone polymer comprising the product of polyfunctional silicone monomers through the halogen compound additive and heating the halogen compound additive with the reactive liquid silicone polymer dispersed therethrough to a temperature and for a time sufficient to effect a reaction of the silicone, then combining the said reacted, liquid silicone polymer treated halogen compound additive with the polymeric compound.

4. The method of claim 3, wherein the reactive liquid silicone polymer comprises the product of trifunctional $CH_3SiO_{1.5}$ units and difunctional $(CH_3)_2SiO$ units.

5. A method of enhancing the electrical properties of a polymeric electrical insulation compound containing a halogen compound flame retardant additive, comprising treating the halogen compound flame retardant additive by dispersing a heat reactive, liquid silicone polymer comprising the product of trifunctional $CH_3SiO_{1.5}$ units and difunctional $(CH_3)_2SiO$ units through the halogen compound additive and heating the halogen compound additive with the heat reactive, liquid silicone polymer dispersed therethrough at a temperature and for a time sufficient to effect a reaction of the silicone, then combining the said heat reacted, liquid silicone polymer treated halogen compound flame retardant additive with the polymeric insulation compound.

6. The method of claim 5, wherein the heat reactive, liquid silicone polymer is the product of a combination of a major amount of difunctional $(CH_3)_2SiO$ monomer units and a minor amount of trifunctional $CH_3SiO_{1.5}$ monomer units.

7. A method of enhancing the electrical properties of a polyolefin electrical insulation compound containing a polar halogen compound flame retardant additive, comprising treating the polar halogen compound flame retardant additive by dispersing a heat reactive, liquid silicone polymer comprising the product of a combination of polyfunctional silicone monomers through the polar halogen compound additive and heating the polar halogen compound additive with the heat reactive, liquid silicone polymer dispersed therethrough at a temperature and for a time sufficient to effect a reaction of the silicone, then combining the said heat reacted, liquid silicone polymer treated polar halogen compound flame retardant additive with the polymer compound.

8. The method of claim 7, wherein the heat reactive, liquid silicone polymer is the product of a combination of a major amount of difunctional $(CH_3)_2SiO$ monomer units and a minor amount of trifunctional $CH_3SiO_{1.5}$ monomer units.

9. The method of claim 8, wherein the heating of the polar halogen compound flame retardant additive with the heat reactive, liquid silicone polymer dispersed therethrough is at a temperature of at least about 150° C. and for a period of time sufficient to effect a reaction of the liquid silicone polymer.

10. The method of claim 7, wherein the heat reactive, liquid silicone polymer is dispersed through the polar additive is an amount of about 1 percent to about 5 percent by weight of the polar halogen compound flame retardant additive.

11. A method of manufacturing an electrical conductor comprising a metallic conductive element having a flame-resistant polyolefin polymer compound insulation thereabout including a halogen-containing flame retardant and of enhanced electrical properties, comprising treating the halogen-containing flame retardant by dispersing a heat reactive, liquid silicone polymer through the flame retardant and heating the flame retardant with the heat reactive, liquid silicone polymer dispersed therethrough to a temperature and for a time sufficient to effect a reaction of the silicone, then combining the said heat reacted, liquid silicone polymer treated flame retardant with a polyolefin polymer compound insulation, and applying the same to a metallic conductive element.

12. The method of manufacturing an electrical conductor of claim 11, wherein the heat reactive, liquid silicone polymer is the product of polyfunctional silicone monomers.

13. The method of manufacturing an electrical conductor of claim 11, wherein the polyolefin polymer compound comprises a crosslink curable polyethylene.

14. A method of manufacturing an electrical conductor comprising a metallic conductive element having a flame-resistant polyethylene polymer compound insulation thereabout including a halogen-containing flame retardant and of enhanced electrical properties, comprising treating the halogen-containing flame retardant by dispersing a heat reactive, liquid silicone polymer comprising the product of a combination of a major amount of difunctional $(CH_3)_2SiO$ monomer units and a minor amount of trifunctional $CH_3SiO_{1.5}$ monomer units through the flame retardant and heating the flame retardant with the heat reactive, liquid silicone polymer dispersed therethrough to a temperature and for a time sufficient to effect a reaction of the silicone polymer, then combining the said heat reacted, silicone polymer treated flame retardant with a crosslink curable polyethylene polymer compound insulation, and applying the same to a metallic conductor element and crosslink curing the polyethylene.

15. The method of claim 14, wherein the treated flame-retardant includes antimony oxide.

16. An electrical conductor comprising a metallic conductive element having a halogen-containing flame resistant polyolefin compound insulation thereabout of enhanced electrical properties, said insulation comprising the heat reaction product of a halogen-containing flame retardant and a heat reactive, liquid silicone polymer product of polyfunctional silicone monomers.

17. An electrical conductor comprising a metallic conductive element having a halogen-containing flame resistant crosslink cured polyethylene compound insulation thereabout of enhanced electrical properties, said insulation comprising the heat reaction product of a halogen-containing flame retardant and a heat reactive, liquid silicone polymer comprising the product of a major amount of difunctional $(CH_3)_2SiO$ monomer units and a minor amount of trifunctional $CH_3SiO_{1.5}$ monomer units.

18. The product of claim 17, wherein the treated flame retardant includes antimony oxide and fumed silica.

* * * * *